United States Patent
Hong et al.

(10) Patent No.: US 12,298,785 B2
(45) Date of Patent: May 13, 2025

(54) AUTOMATED GUIDED VEHICLE AND METHOD OF CALIBRATING OBJECT-FETCHING ROUTE

(71) Applicant: Industrial Technology Research Institute, Hsinchu (TW)

(72) Inventors: Ruei-Jhih Hong, Nantou County (TW); Yong-Ren Li, Taichung (TW); Ta-Cheng Ma, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 338 days.

(21) Appl. No.: 18/088,625

(22) Filed: Dec. 26, 2022

(65) Prior Publication Data
US 2024/0160211 A1 May 16, 2024

(30) Foreign Application Priority Data
Nov. 14, 2022 (TW) .................... 111143372

(51) Int. Cl.
G05D 1/249 (2024.01)
G05D 1/646 (2024.01)

(52) U.S. Cl.
CPC ............ *G05D 1/646* (2024.01); *G05D 1/249* (2024.01)

(58) Field of Classification Search
CPC ................ G05D 1/646; G05D 1/249
See application file for complete search history.

(56) References Cited

U.S. PATENT DOCUMENTS

| | | | |
|---|---|---|---|
| 9,828,223 B2 | 11/2017 | Svensson et al. | |
| 11,289,192 B2 | 3/2022 | Wang et al. | |
| 2022/0253071 A1 | 8/2022 | Thode | |

FOREIGN PATENT DOCUMENTS

| | | |
|---|---|---|
| CN | 107918384 | 4/2018 |
| CN | 108803603 | 11/2018 |
| CN | 109189066 | 1/2019 |
| CN | 209161405 | 7/2019 |
| CN | 110789529 | 12/2020 |
| CN | 114115242 | 3/2022 |

(Continued)

OTHER PUBLICATIONS

Yong-Ren Li et al., "Automatic Guided Vehicle and Method for Forking Pallet", Unpublished Taiwan application No. 111100044, Filed on Jan. 3, 2022, with English abstract thereof, pp. 1-30.

(Continued)

*Primary Examiner* — Mathew Franklin Gordon
(74) *Attorney, Agent, or Firm* — JCIPRNET

(57) ABSTRACT

An automated guided vehicle (AGV) includes an image capturing device, a storage device, a fetching device, a driving device and a processor. The processor is configured to execute: controlling the AGV to move from a starting position to a target position according to a navigation coordinate system, the target position corresponding to the object to be fetched; capturing a depth image from the object to be fetched through the image capturing device; performing image recognition on the depth image to obtain reference pixel information; converting the reference pixel information to the navigation coordinate system according to a coordinate mapping algorithm to obtain a calibrated position; and determining an object-fetching route according to the target position and the calibrated position, and controlling the AGV to move according to the object-fetching route to fetch the object to be fetched.

20 Claims, 9 Drawing Sheets

(56) References Cited

FOREIGN PATENT DOCUMENTS

| | | |
|---|---|---|
| JP | H09249399 | 9/1997 |
| TW | 202125139 | 7/2021 |
| TW | I751664 | 1/2022 |
| TW | I756844 | 3/2022 |

OTHER PUBLICATIONS

"Office Action of Taiwan Counterpart Application", issued on Dec. 6, 2023, p. 1-p. 5.

AUTOMATED GUIDED VEHICLE AND METHOD OF CALIBRATING OBJECT-FETCHING ROUTE

CROSS-REFERENCE TO RELATED APPLICATION

This application claims the priority benefit of Taiwan application serial No. 111143372, filed on Nov. 14, 2022. The entirety of the above-mentioned patent application is hereby incorporated by reference herein and made a part of this specification.

TECHNICAL FIELD

The disclosure relates to an automated guided vehicle (AGV) technique, and relates to an AGV and a method of calibrating an object-fetching route.

BACKGROUND

As logistic demands in e-commerce industries have been increasing, the traditional operation mode which solely relies on manpower to transport, pick up, and tally goods can no longer satisfy the needs for good shipment nowadays. Besides, considering the aging of population worldwide, major logistics industries are impacted by labor shortage and decline in labor force. The flow of goods determines the overall production efficiency of a warehouse. By introducing automated guided vehicles (AGVs), manpower and work time can be cut down significantly, and the operation mode is shifted from "person to goods" to "goods to person", which saves an additional procedure of finding goods by relevant personnel. In addition to executing route analysis and goods transportation commands according to a map prepared in advance based on the job assignment of the system, AGVs may also utilize artificial intelligence (AI), machine learning, big data, and various sensors to sense changes in the surrounding, thereby making sophisticated determination and reaction.

The movement path of the conventional AGV relies on the map stored in an internal storage device. Such map may be set up by, for example, loading a map prepared by the user in advance, or utilizing the navigation technique of simultaneous localization and mapping (SLAM). However, in the case where the work area in logistics or manufacture industries is larger, and goods or manufactured articles are easier to move, the positioning based on SLAM may be affected, leading to an error of about 1M in the positioning accuracy of the AGV. For example, if AGV is applied to an automated vehicle for forking and fetching a pallet, it needs to ensure that the fork of the automated forklift is accurately aligned to forklift pockets located in the pallet. A conventional "blind fork lifting" process in which the AGV moves to the destination in accordance with the map prepared by the user and then directly attempts to insert the fork into the pallet no longer meets the practical demands.

SUMMARY

An embodiment of the disclosure provides an automated guided vehicle. The automated guided vehicle includes: an image capturing apparatus; and a storage device; a fetching device, fetching an object to be fetched in a field; a driving device, driving the automated guided vehicle to move in the field; and a processor, coupled to the image capturing device, the storage device, the fetching device, and the driving device. The processor is configured to: control, in accordance with a navigation coordinate system, the automated guided vehicle to move from a starting position to a target position corresponding to the object to be fetched; capture, by using the image capturing device, a depth image from the object to be fetched; performing image recognition on the depth image to obtain reference pixel information; convert, in accordance with a coordinate mapping algorithm, the reference pixel information to the navigation coordinate system to obtain a calibrated position; and determining, in accordance with the target position and the calibrated position, the object-fetching route, and controlling the automated guided vehicle to move in accordance with the object-fetching route and fetch the object to be fetched.

An embodiment of the disclosure provides method of calibrating an object-fetching route, suitable for an automated guided vehicle. The method includes: controlling, in accordance with a navigation coordinate system, the automated guided vehicle to move from a starting position to a target position corresponding to an object to be fetched; capturing, by using an image capturing device, a depth image from the object to be fetched; performing, by using processor, image recognition on the depth image to obtain reference pixel information; converting, by using the processor and in accordance with a coordinate mapping algorithm, the reference pixel information into the navigation coordinate system to obtain a calibrated position; and determining, by using the processor and in accordance with the target position and the calibrated position, the object-fetching route, and controlling the automated guided vehicle to move in accordance with the object-fetching route and fetch the object to be fetched.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
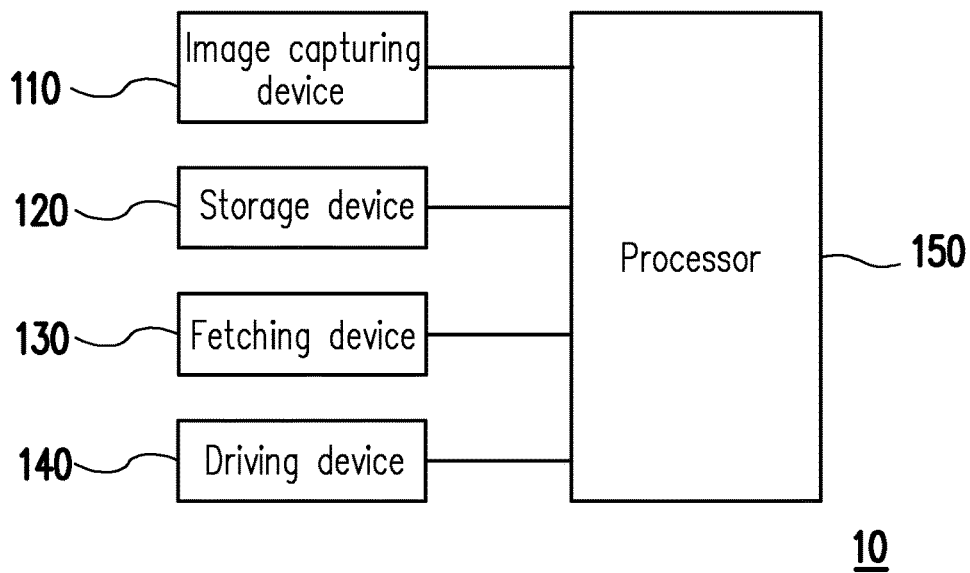
FIG. 1 is a block diagram of an automated guided vehicle according to an embodiment of the disclosure.

Some embodiments of the disclosure will be described in detail with reference to the accompanying drawings. For the referenced reference symbols in the following description, when like reference symbols appear in different figures, such symbols shall be regarded as like or similar components. These embodiments are only a part of the disclosure, and shall not be deemed as disclosing all possible embodiments of the disclosure. Specifically, these embodiments merely serve as examples of the scope of the disclosure. Elements/components/steps with same reference numerals represent same or similar parts in the drawings and embodiments. Descriptions of elements/components/steps labeled with same symbols or described with same terms in different embodiments may be incorporated by reference.

The embodiments of the disclosure provide an automated guided vehicle and a method of calibrating an object-fetching route, in which a navigation technique and coordinate mapping of a camera are integrated, so that the automated guided vehicle is able to move automatically to a target point, automatically recognize a position and an angle of an object, and automatically fetches the object and moves to an unload area to unload goods. The processes are fully automated without any manpower.

FIG. 1 is a block diagram of an automated guided vehicle according to an embodiment of the disclosure. Referring to FIG. 1, an automated guided vehicle (AGV) 10 includes an image capturing device 110, a storage device 120, a fetching device 130, a driving device 140, and a processor 150. The processor 150 is coupled to the image capturing device 110, the storage device 120, the fetching device 130, and the driving device 140.

The image capturing device 110 captures an image. In an embodiment, the image capturing device 110 may include a digital camera, a video camera, or a camera lens with a lens element and a light sensor. The light sensor serves to sense the intensity of light entering the lens element, thereby generating an image. The light sensor may be, for example, a charge coupled device (CCD), a complementary metal-oxide semiconductor (CMOS) device, or other devices, and able to sense the intensity of light to generate an image of a camera scene. In an embodiment, the image capturing device 110 may include an RGB image sensor including color pixels of red (R), green (G), and blue (B) and configured to capture color information of red light, green light, blue light, etc., in the camera scene and synthesize the color information to generate the image of the camera scene. In an embodiment, the image capturing device 110 may include a depth camera or other similar devices capable of calculating depth information in front of the depth camera by actively generating light, ultrasonic waves, laser, etc. In an embodiment, the image capturing device 110 may include an infrared (IR) camera. By adjusting a wavelength sensing range of the light sensor, the IR camera is able to sense infrared light. For example, infrared light information in the camera scene may be captured by using the light sensor as pixels, and synthesize the infrared light information to generate a depth image of the camera scene. In an embodiment, the image capturing device 110 may be a combination of an RGB-D camera, a binocular camera, an RGB camera, and a lidar sensor provided with a distance sensing function. In an embodiment, the image capturing device 110 is one of a depth camera, an infrared light emitter and an infrared lens element, multiple cameras, and a projection device and a camera.

The storage device 120 may store a computer program. In an embodiment, the storage device 120 may be any type of fixed or removable random access memory (RAM), read-only memory (ROM), flash memory, a hard disk drive (HDD), a solid state drive (SSD), similar components, or a combination thereof. The storage device 120 serves to store multiple modules, computer programs or various applications executable by the processor 150.

The fetching device 130 fetches an object to be fetched in a field. In an embodiment, the object to be fetched is a pallet, the fetching device 130 includes a fork, the fork corresponds to the forklift pockets of the pallet. Thus, the AGV 10 may fetch the object to be fetched by forking the pallet using the fork. In an embodiment, the fetching device 130 includes a touch sensor. When the fork is inserted into the forklift pockets of the corresponding pallet, the touch sensor senses whether the fork touches the edge of the pallet, thereby determining whether the operation of forking the pallet is completed.

The driving device 140 drives the AGV 10 to move in the field. In an embodiment, the driving device 140 may be, for example, a steering wheel mechanism powered by a motor. The motor may be a servo motor, a stepping motor, a magnetic levitation motor or a linear motor, etc., and serve to provide power to rotate the steering wheel mechanism.

The processor 150 is configured to handle the entirety or a portion of the operation of the AGV 10. In an embodiment, the processor 150 may be a central processing unit (CPU) or other programmable general-purpose or specific-purpose micro control units (MCUs), microprocessors, digital signal processors (DSPs), programmable controllers, application specific integrated circuits (ASICs), graphic processing units (GPUs), image signal processors (ISPs), image processing units (IPUs), arithmetic logic units (ALUs), complex programmable logic devices (CPLD), field programmable gate arrays (FPGAs), other similar components, or a combination thereof. The processor 150 is configured to execute a method of calibrating an object-fetching route shown in FIG. 2.

Figure 2:
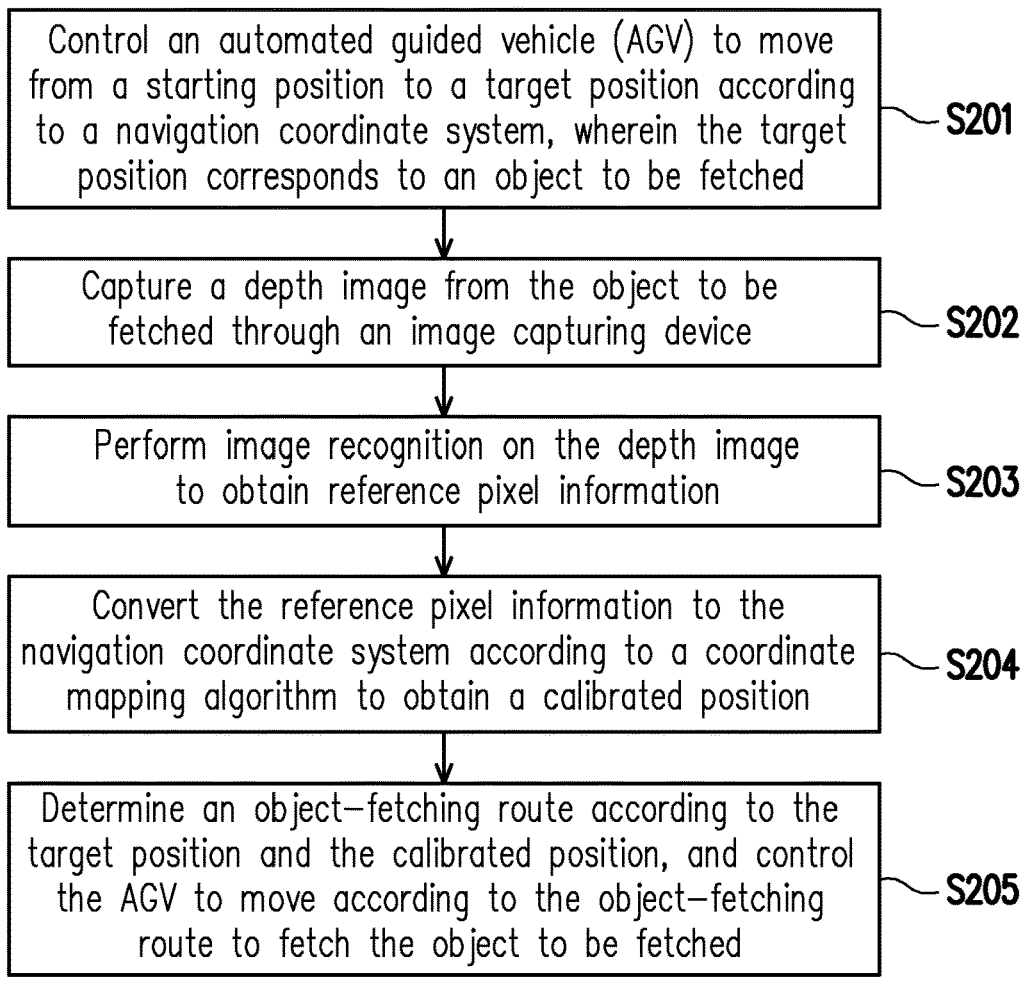
FIG. 2 is a method of calibrating an object-fetching route according to an embodiment of the disclosure.

FIG. 2 is a method of calibrating an object-fetching route according to an embodiment of the disclosure. The method of calibrating the object-fetching route shown in FIG. 2 is suitable for the AGV 10. In Step S201, the processor 150 controls the AGV 10 to move from a starting position to a target position according to a navigation coordinate system. The target position corresponds to an object to be fetched. In Step S202, the processor 150 captures a depth image from the object to be fetched by using the image capturing device 110. In Step S203, the processor 150 performs image recognition on the depth image and obtains reference pixel information. In Step S204, the processor 150 converts the reference pixel information into the navigation coordinate system in accordance with a coordinate mapping algorithm to obtain a calibrated position. In Step S205, the processor 150 determines an object-fetching route according to the target position and the calibrated position, and controls the AGV 10 to move in accordance with the object-fetching route and fetch the object to be fetched.

Figure 3:
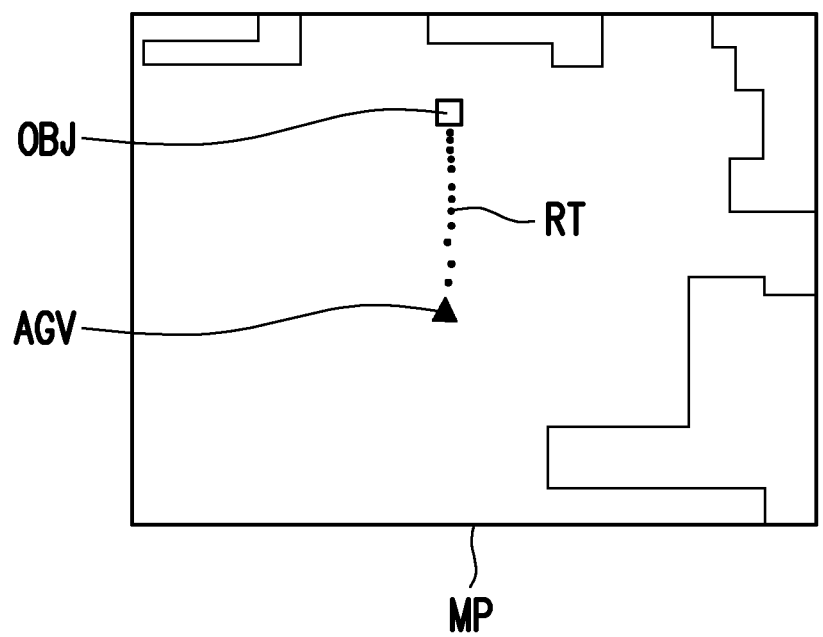
FIG. 3 is a schematic view illustrating a navigation coordinate system according to an embodiment of the disclosure.

FIG. 3 is a schematic view illustrating a navigation coordinate system according to an embodiment of the disclosure. The processor 150 may establish a map MP according to the navigation coordinate system, and mark the positions of an automated guided vehicle AGV and an object OBJ to be fetched on the map MP. The automated guided vehicle AGV is, for example, the AGV 10 of FIG. 1. The object OBJ to be fetched is, for example, a pallet. In an embodiment, the navigation coordinate system is a two-dimensional simultaneous localization and mapping (2D SLAM) coordinate system. The processor 150 sets the coordinates of the automated guided vehicle AGV as the starting position and the coordinates of the object OBJ to be fetched as the target position, and determines a route RT. The processor 150 controls the automated guided vehicle AGB to arrive at the target position along the route RT. At this time, the automated guided vehicle AGV is in the vicinity of the object OBJ to be fetched.

Because of positioning accuracy, the map MP generated by the conventional 2D SLAM technique may exhibit an error of about 1M. When the automated guided vehicle AGV moves to the target position of the object OBJ to be fetched that is set according to the map MP, due to the positioning error, the automated guided vehicle AGV is actually deviated from the object OBJ to be fetched in terms of distance and angle. As a result, the automated guided vehicle AGV is unable to successfully fetch the object OBJ to be fetched.

Figure 4A:
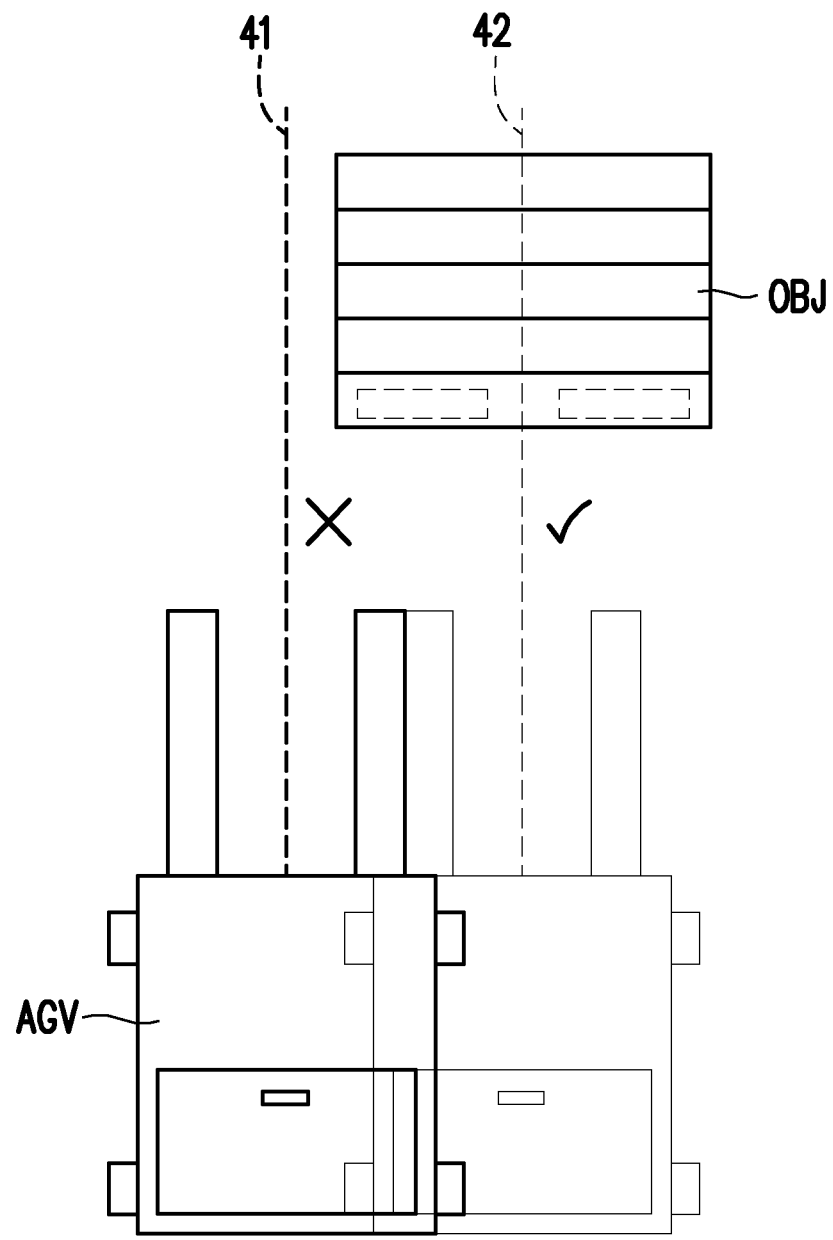
FIG. 4A is a schematic view illustrating that an automated guided vehicle fetches an object according to an embodiment of the disclosure.

FIG. 4A is a schematic view illustrating that an automated guided vehicle fetches an object according to an embodiment of the disclosure. As shown in FIG. 4A, the automated guided vehicle AGV has arrived at the target position. However, because of the positioning error of the navigation coordinate system, the object OBJ to be fetched is actually deviated from the automated guided vehicle AGV. With the deviation resulting from the positioning error, the fetching device 130 (e.g., fork) of the automated guided vehicle AGV is unable to be aligned with the object OBJ (e.g., pallet) to be fetched. If the automated guided vehicle AGV fetches the object along a route 41, the automated guided vehicle AGV may not be able to successfully fetch the object OBJ to be fetched. Since the object OBJ to be fetched is actually located on a route 42, the calibrated position of the object OBJ to be fetched in the navigation coordinate system is updated at this time, and the automated guided vehicle AGV plans a route again.

Figure 4B:
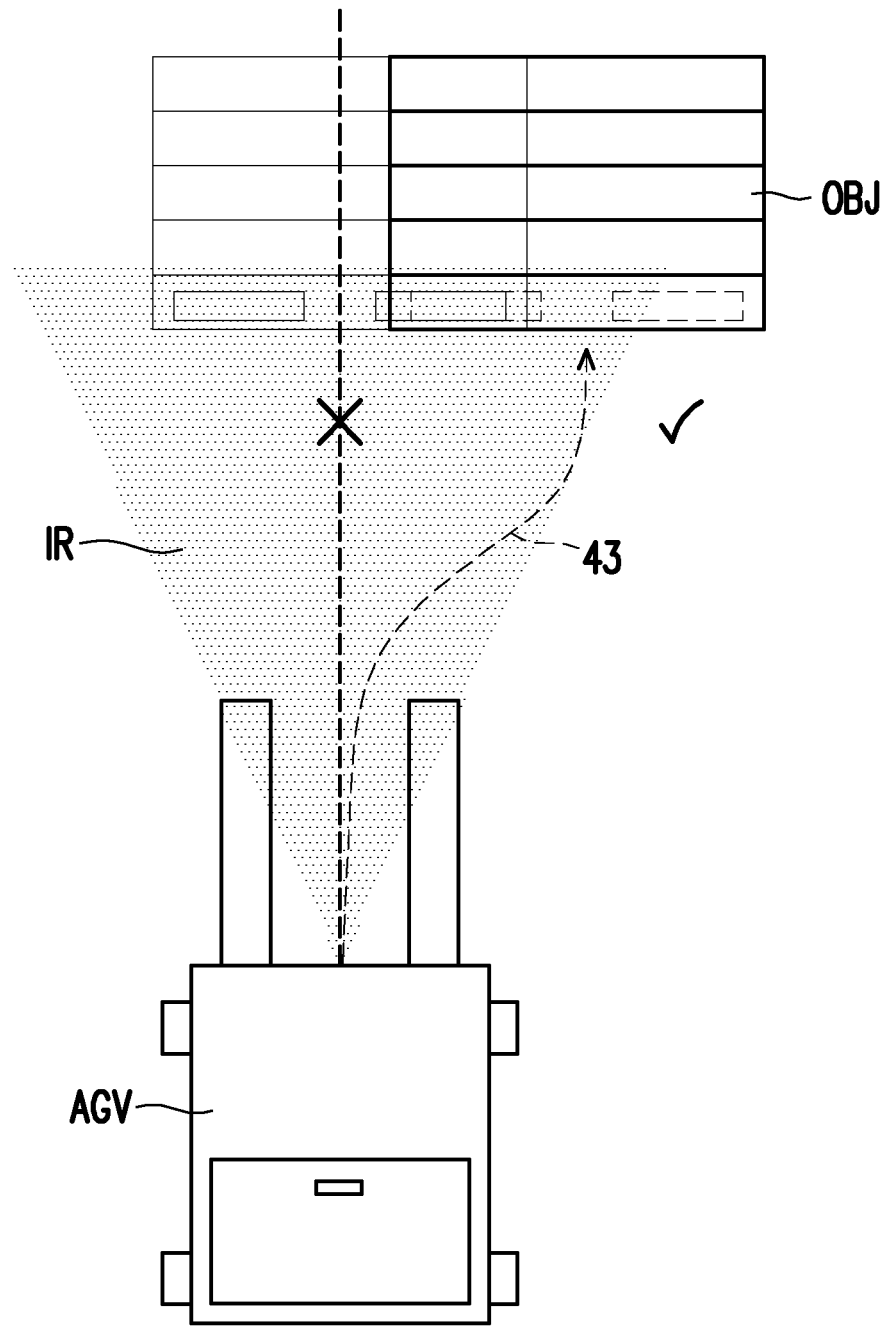
FIG. 4B is a schematic view illustrating that the automated guided vehicle calibrates an object-fetching route according to an embodiment of the disclosure.

FIG. 4B is a schematic view illustrating that the automated guided vehicle calibrates an object-fetching route according to an embodiment of the disclosure. As shown in FIG. 4B, when the automated guided vehicle AGV arrives at the target position, since the automated guided vehicle AGV is already located in the vicinity of the object OBJ to be fetched, the automated guided vehicle AGV may capture a depth image from the object OBJ to be fetched that is located nearby by using the image capturing device 110, perform image recognition IR on the depth image, and obtain the calibrated position of the object OBJ to be fetched. Then, in accordance with the target position and the calibrated position, the automated guided vehicle AGV plans a route 43 again and performs object fetching. As an example, Taiwan Patent Application No. 111100044 provides an automatic guided vehicle and a method for forking a pallet.

Figure 5:
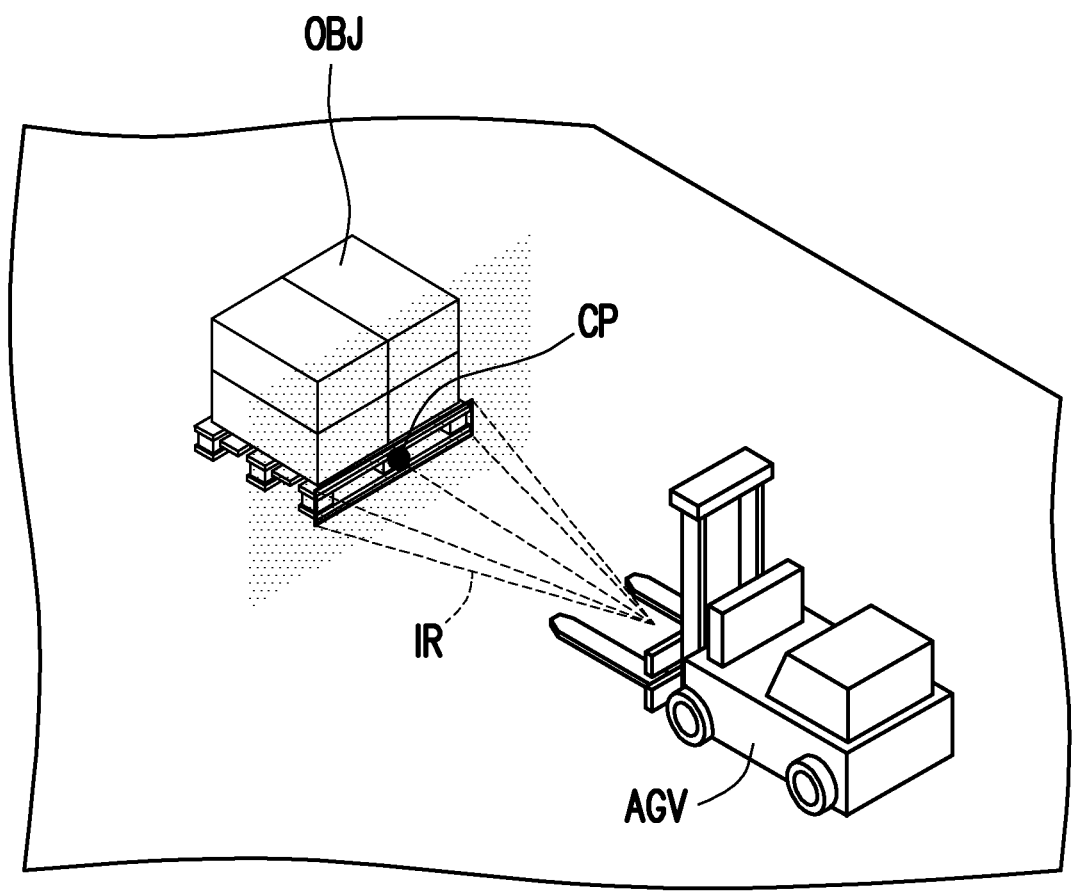
FIG. 5 is a schematic view illustrating that the automated guided vehicle captures an image from an object according to an embodiment of the disclosure.

FIG. 5 is a schematic view illustrating that the automated guided vehicle captures an image from an object according to an embodiment of the disclosure. When the automated guided vehicle AGV has moved to the vicinity of the object OBJ to be fetched, in order to calibrate the positioning error of the navigation coordinate system to successfully fetch the object OBJ to be fetched, the automated guided vehicle AGV may capture a depth image from the object OBJ to be fetched by using the image capturing device 110, and perform the image recognition IR on the depth image to obtain reference pixel information. In an embodiment, the reference pixel information includes pixel coordinate values of the object OBJ to be fetched and a rotation angle. In an embodiment, the processor 150 performs the image recognition IR on the depth image by using an artificial intelligence (AI) image recognition model and obtains the pixel coordinate values and the rotation angle. In an embodiment, the processor 150 obtains a center distance by using the image capturing device 110. As an example, the AI image recognition model for the image recognition IR may adopt the machining learning technique disclosed in an automated guided vehicle navigation device and the method thereof of Taiwan Patent Application No. 109133271, in which a dimension reduction method is applied to process depth image data and thereby reduce the data volume of the depth image data, and deep learning is performed in accordance with the depth image data after dimension reduction by using a machine learning model.

Specifically, the processor 150 calculates the pixel position corresponding to a center point CP of the object OBJ to be fetched from the reference pixel information of the depth image, and converts the pixel position of the center point CP into the calibrated position in the navigation coordinate system by using the coordinate mapping algorithm. In this way, the automated guided vehicle AGV may plan the object-fetching route in accordance with the target position and the calibrated position, so as to accurately fetch the object OBJ to be fetched.

In an embodiment, the AI image recognition model adopted by the processor 150 is a convolutional neural network model trained by using multiple images of the object OBJ to be fetched as a data set.

Figure 6:
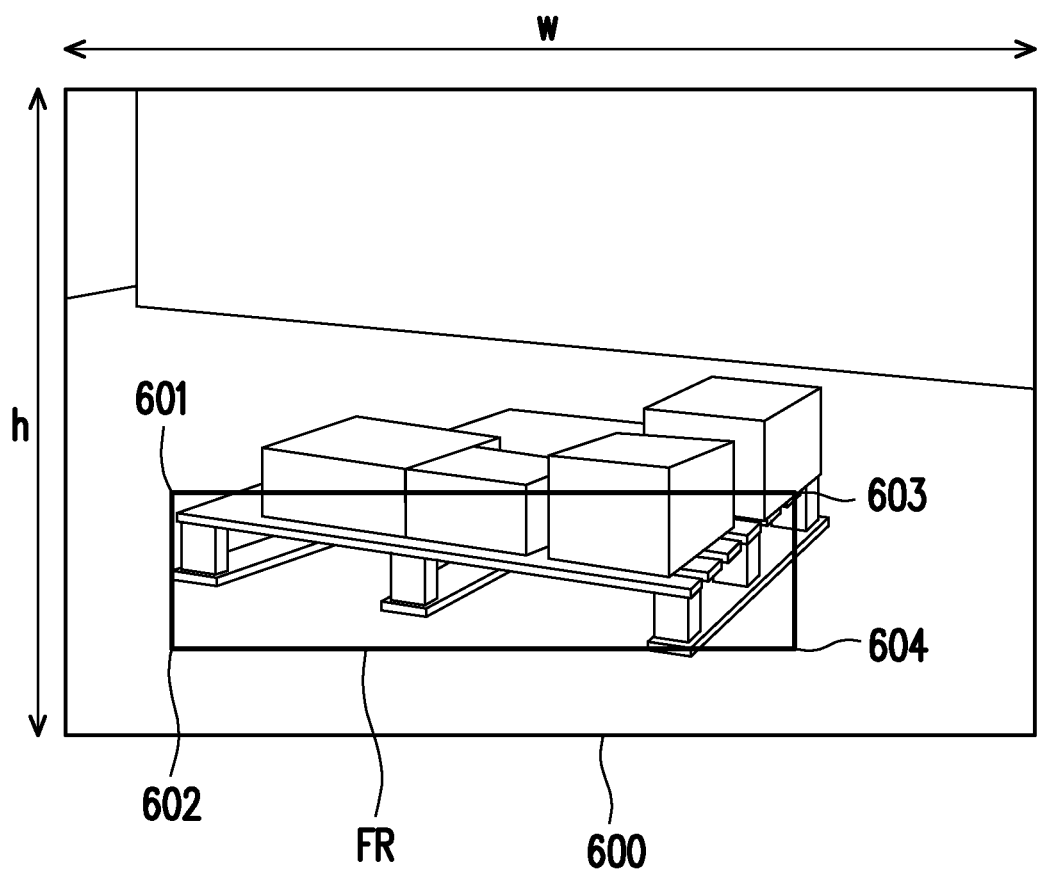
FIG. 6 is a schematic view illustrating performing image recognition on a depth image to obtain reference pixel information according to an embodiment of the disclosure.

FIG. 6 is a schematic view illustrating performing image recognition on a depth image to obtain reference pixel information according to an embodiment of the disclosure. An image 600 captured by the image capturing device 110 has a height h and a width w. The processor 150 performs image recognition on the image 600 to obtain the reference pixel information. In an embodiment, the reference pixel information includes pixels 601, 602, 603, and 604 in a recognition frame FR. In an embodiment, the reference pixel information includes pixel coordinate values $(P_{xi}, P_{yi})$, i=1~4 of the pixels 601, 602, 603, 604 and a rotation angle (yaw). In an embodiment, the processor 150 obtains distances $Z_{ci}$, i=1~4 of the pixels 601, 602, 603, 604 by using the image capturing device 110. In an embodiment, the processor 150 calculates coordinate values $(X_{ci}, Y_{ci})$ of the object OBJ in the coordinate system of the image capturing device 110 in accordance with Equations (1) and (2) in the following:

$$X_{ci} = (P_{xi} - c_x) * \frac{Z_{ci}}{f_x} \qquad (1)$$

-continued $$Y_{ci} = (P_{yi} - c_y) * \frac{Z_{ci}}{f_y} \qquad (2)$$

In the above equations, $c_x$ represents an image resolution width $$\frac{w}{2},$$

$c_y$ represents an image resolution height $$\frac{h}{2},$$

$f_x$ represents a depth image width focal length value, $f_y$ represents a depth image height focal length value, and ($c_x$, $c_y$) may represent the coordinate values of the image center point. Such parameters may be obtained from the specification setting of the image capturing device 110.

Figure 7:
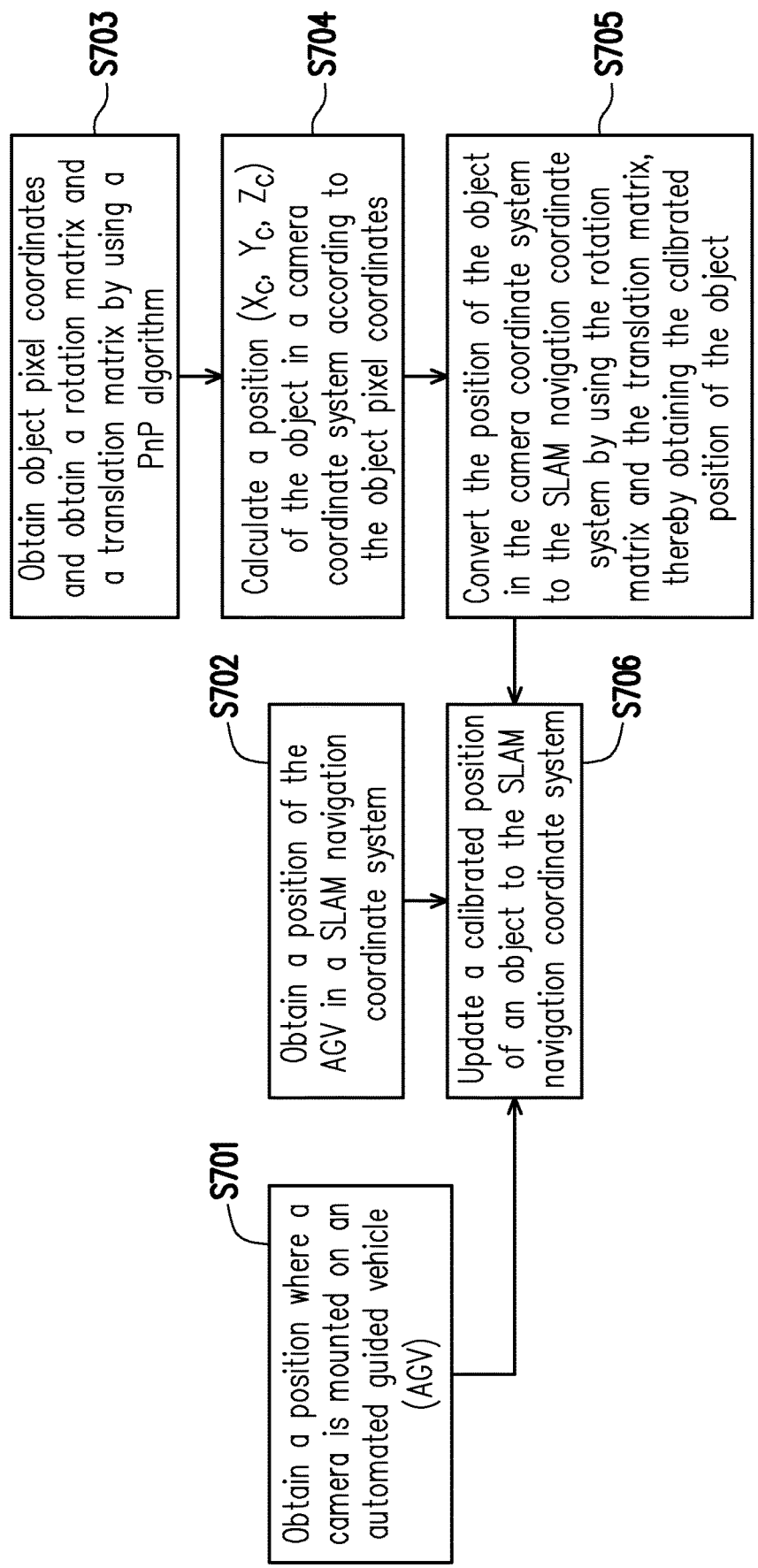
FIG. 7 is a flowchart illustrating obtaining a calibrated position according to a coordinate mapping algorithm in an embodiment of the disclosure.

FIG. 7 is a flowchart illustrating obtaining a calibrated position according to a coordinate mapping algorithm in an embodiment of the disclosure. In Step S701, the processor 150 obtains the position where the camera is mounted on the automated guided vehicle AGV. In Step S702, the processor 150 obtains the position of the automated guided vehicle AGV in the SLAM navigation coordinate system. In Step S703, the processor 150 obtains object pixel coordinates and obtains a rotation matrix and a translation matrix by using a Perspective-n-Point (PnP) algorithm. In Step S704, the processor 150 calculates the position ($X_c$, $Y_c$, $Z_c$) of the object in the camera coordinate system in accordance with the pixel coordinates of the object OBJ. In Step S705, the processor 150 converts the position of the object OBJ in the camera coordinate system into the SLAM navigation coordinate system by using the rotation matrix and the translation matrix to obtain the calibrated position of the object OBJ. In Step S706, the processor 150 updates the calibrated position of the object OBJ to the SLAM navigation coordinate system.

Specifically, the relationship between the position ($X_c$, $Y_c$, $Z_c$) of the object in the camera coordinate system and the pixel coordinates of the object OBJ may be represented in Equation (3) as follows:

$$\begin{bmatrix} p_x \\ p_y \\ 1 \end{bmatrix} = \begin{bmatrix} f_x & 0 & c_x \\ 0 & f_y & c_y \\ 0 & 0 & 1 \end{bmatrix} \begin{bmatrix} X_c \\ Y_c \\ Z_c \end{bmatrix}. \qquad (3)$$

Specifically, the relationship between the pixel coordinates of the object OBJ and the calibrated position of the object OBJ may be represented in Equation (4) as follows:

$$\begin{bmatrix} p_x \\ p_y \\ 1 \end{bmatrix} = \begin{bmatrix} f_x & 0 & c_x \\ 0 & f_y & c_y \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix} \begin{bmatrix} X \\ Y \\ Z \\ 1 \end{bmatrix}. \qquad (4)$$

In the above equation, $$\begin{bmatrix} p_x \\ p_y \\ 1 \end{bmatrix}$$

represents a vector corresponding to the pixel coordinates of the object OBJ, and $$\begin{bmatrix} X \\ Y \\ Z \\ 1 \end{bmatrix}$$

represents a vector corresponding to the calibrated position of the object OBJ.

The rotation matrix $$R = \begin{bmatrix} r_{11} & r_{12} & r_{13} \\ r_{21} & r_{22} & r_{23} \\ r_{31} & r_{32} & r_{33} \end{bmatrix}$$

and the translation matrix $$T = \begin{bmatrix} t_x \\ t_y \\ t_z \end{bmatrix}$$

may be obtained by using the PnP algorithm in Step S703.

In Step S704, the position ($X_c$, $Y_c$, $Z_c$) of the object in the camera coordinate system may be calculated in accordance with Equation (1), (2), or (3).

Therefore, after the rotation matrix R, the translation matrix T, and the position ($X_c$, $Y_c$, $Z_c$) of the object in the camera coordinate system are known, in Step S705, the calibrated position (X, Y, Z) of the object OBJ may be obtained through conversion in accordance with Equation (5) as follows:

$$\begin{bmatrix} X \\ Y \\ Z \\ 1 \end{bmatrix} = \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix}^{-1} \begin{bmatrix} X_c \\ Y_c \\ Z_c \\ 1 \end{bmatrix}. \qquad (5)$$

In Equation (4), a vector $$\begin{bmatrix} X_c \\ Y_c \\ Z_c \\ 1 \end{bmatrix}$$

corresponds to the position of the object (e.g., pallet) in the camera coordinate system. A vector $$\begin{bmatrix} X \\ Y \\ Z \\ 1 \end{bmatrix}$$

corresponds to the calibrated position of the object OBJ, such as the actual coordinates of the pallet in the SLAM navigation coordinate system.

Then, in Step S706, the calibrated position (X, Y, Z) of the object OBJ is updated to the SLAM navigation coordinate system. The automated guided vehicle AGV then determines object-fetching route in accordance with the target position and the calibrated position.

According to Steps S701 to S706 and the calculation of Equation (1) to Equation (5), regarding the actual coordinates of the object OBJ (e.g., the pallet), after the position of the object in the camera coordinate system is obtained by using Equation (3), the rotation matrix R and the translation matrix T of the external parameters of the camera may be obtained through Equation (4), and the position of the object in the camera coordinate system may be recognized by using the AI image recognition model, and the calibrated position of the object OBJ, such as the actual coordinates of the pallet in the SLAM navigation coordinate system, may be obtained through Equation (5).

Figure 8:
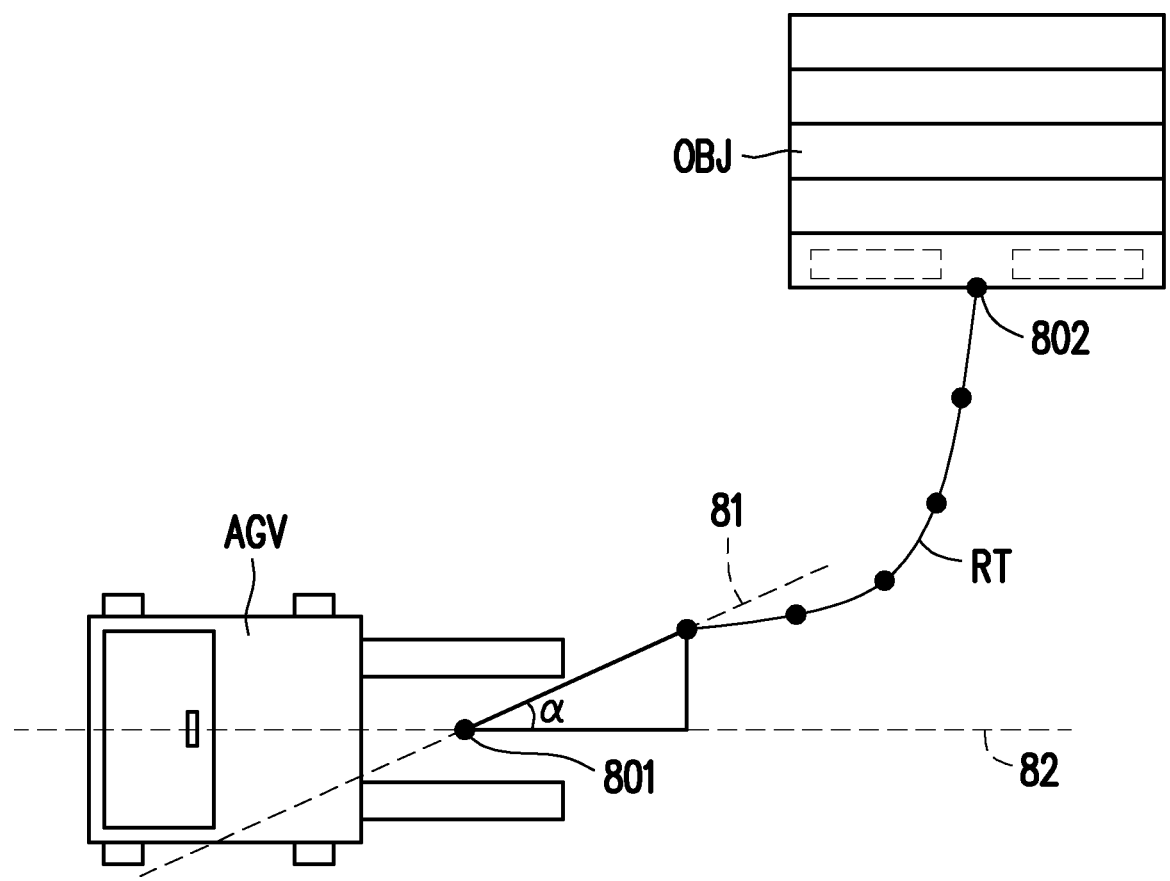
FIG. 8 is a schematic view illustrating determining an object-fetching route according to a target position and a calibrated position in an embodiment of the disclosure.

FIG. 8 is a schematic view illustrating determining an object-fetching route according to a target position and a calibrated position in an embodiment of the disclosure. Referring to FIG. 8, a point 801 corresponds to the target position which the automated guided vehicle AGV has arrived at, and a point 802 corresponds to the calibrated position of the object OBJ to be fetched. The coordinates of the point 801 and the coordinates of the point 802 are indicated on the navigation coordinate system. Accordingly, the automated guided vehicle AGV may plan the object-fetching route RT in accordance with the coordinates of the point 801 and the coordinates of the point 802. In an embodiment, the object-fetching route RT may be a route planning result based on one of a dynamic window approach, a timed-elastic-bands algorithm, an A star algorithm, a Dijkstra algorithm, a pure pursuit algorithm, a linear quadratic regulator algorithm, and a rapidly-exploring random tree algorithm.

The motion mode of the automated guided vehicle AGV may differ as the driving device 140 differs. In an embodiment, the automated guided vehicle AGV has a driving device 140 rotatable in situ. In an embodiment, the driving device 140 of the automated guided vehicle AGV may not be rotatable in situ. In an embodiment, the route planning may be designed in accordance with whether the motion mode of the driving device 140 of the automated guided vehicle AGV is compatible with parameters of omnidirectional movement, in situ rotation, and the maximum rotation angle of the driving device 140. For example, in FIG. 8, after the object-fetching route RT is determined, in an embodiment, the automated guided vehicle AGV may carry out the design by adopting a deflection angle α of turning to the axis (as indicated by a broken line 81) of the object-fetching route RT from the current movement axis (as indicated by a broken line 82) as a route planning parameter, so as to dynamically adjust the object-fetching route RT.

Figure 9A:
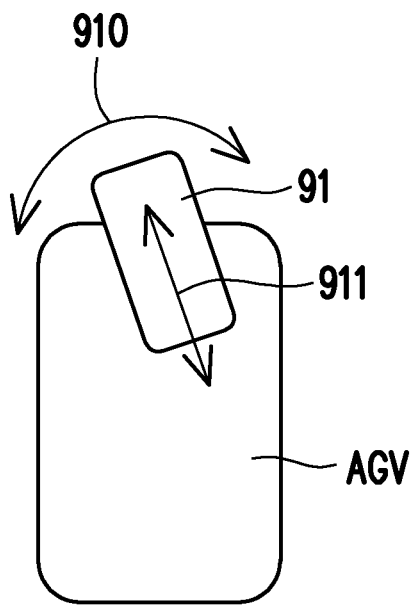
FIG. 9A is a schematic view illustrating a single steering wheel mechanism according to an embodiment of the disclosure.

FIG. 9A is a schematic view illustrating a single steering wheel mechanism according to an embodiment of the disclosure. As shown in FIG. 9A, the driving device of the automated guided vehicle AGV includes a single steering wheel mechanism 91. The single steering wheel mechanism 91 is left-right rotatable in a direction 910 and front-rear movable on the axis of a direction 911. The single steering wheel mechanism 91 is unable to rotate in situ. The single steering wheel mechanism 91 is not capable of omnidirectional movement.

Figure 9B:
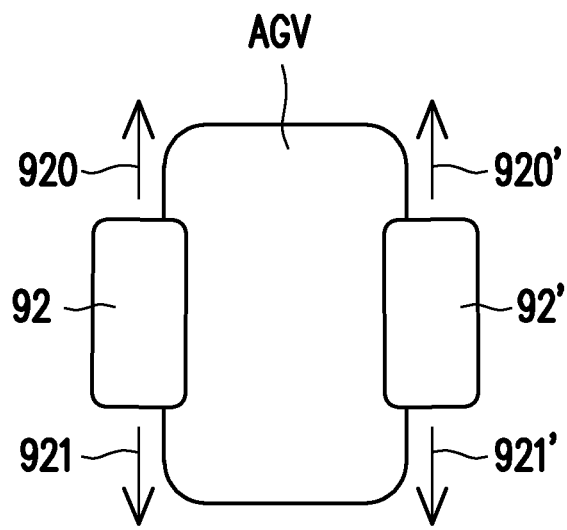
FIG. 9B is a schematic view illustrating a two-wheeled differential mechanism according to an embodiment of the disclosure.

FIG. 9B is a schematic view illustrating a two-wheeled differential mechanism according to an embodiment of the disclosure. As shown in FIG. 9B, the driving device of the automated guided vehicle AGV includes a two-wheeled differential mechanism 92 and 92'. Individual different mechanisms 92 and 92' in the two-wheeled differential mechanism 92 and 92' are respectively and independently front-rear movable in directions 920 and 921 and in directions 920' and 921'. The two-wheeled differential mechanism 92, 92' is rotatable in situ. The two-wheeled differential mechanism 92, 92' is not capable of omnidirectional movement.

Figure 9C:
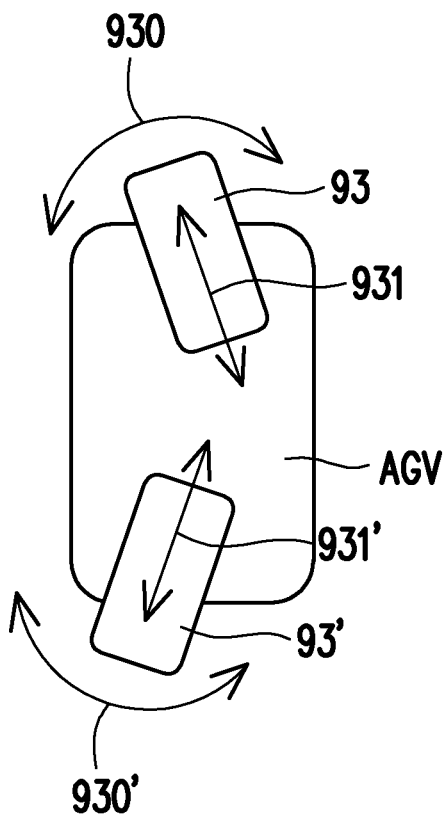
FIG. 9C is a schematic view illustrating a double steering wheel mechanism according to an embodiment of the disclosure.

FIG. 9C is a schematic view illustrating a double steering wheel mechanism according to an embodiment of the disclosure. As shown in FIG. 9C, the driving device of the automated guided vehicle AGV includes a double steering wheel mechanism 93 and 93'. Individual steering wheel mechanisms 93 and 93' in the double steering wheel mechanism 93 and 93' are independent from each other. The steering wheel mechanism 93 is left-right rotatable in a direction 930 and front-rear movable on the axis of a direction 931. The steering wheel mechanism 93' is left-right rotatable in a direction 930' and front-rear movable on the axis of a direction 931'. The double steering wheel mechanism 93 and 93' is rotatable in situ. The double steering wheel mechanism 93 and 93' is capable of omnidirectional movement.

Figure 9D:
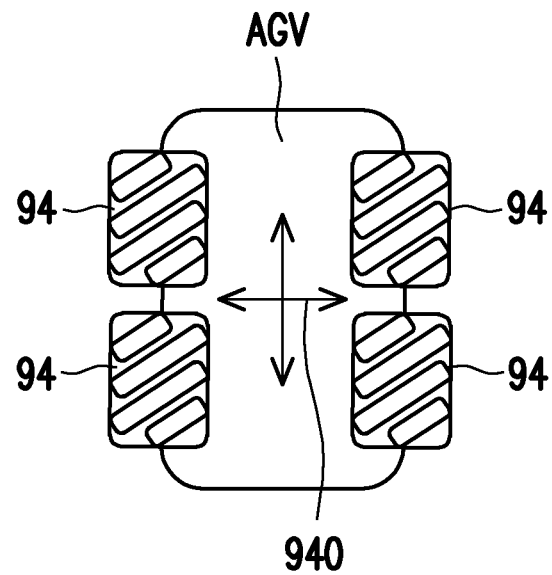
FIG. 9D is a schematic view illustrating a Mecanum wheel mechanism according to an embodiment of the disclosure.

FIG. 9D is a schematic view illustrating a Mecanum wheel mechanism according to an embodiment of the disclosure. As shown in FIG. 9C, the driving device of the automated guided vehicle AGV includes a Mecanum wheel mechanism 94. The Mecanum wheel mechanism 94 is front-rear, left-right, or obliquely movable in a direction 940. The Mecanum wheel mechanism 94 is rotatable in situ. The Mecanum wheel mechanism 94 is capable of omnidirectional movement.

In an embodiment, the driving device 140 includes the single steering wheel mechanism 91, the routing wheel RT is a smooth curve, and the smooth curve is set by using a Bezier curve function in accordance with the target position 801 and the calibrated position 802.

In an embodiment, the driving device 140 includes the two-wheeled differential mechanism 92 and 92'. In an embodiment, the driving device 140 includes the double steering wheel mechanism 93 and 93'. In an embodiment, the driving device 140 includes the Mecanum wheel mechanism 94. In an embodiment, the driving device 140 includes one of the two-wheeled differential mechanism, the Mecanum wheel mechanism, and the double steering wheel mechanism.

In an embodiment, controlling the automated guided vehicle AGV to move in accordance with the object-fetching route RT and fetch the object OBJ to be fetched includes: controlling the automated guided vehicle AGV to move to the front of the object OBJ to be fetched in accordance with the object-fetching route RT; and controlling the automated guided vehicle AGV to rotate in situ to be aligned with the object OBJ to be fetched and fetch the object OBJ to be fetched.

In view of the foregoing, in the embodiments according to the disclosure, the depth camera and the image recognition technique are adopted to recognize the image of the object to be fetched and obtain the reference pixel information. In addition, by adopting the coordinate mapping algorithm, the reference pixel information is converted to the navigation coordinate system to obtain the calibrated position. Accordingly, by mapping the actual position of the object to be fetched to the navigation coordinate system of the automated guided vehicle through coordinate mapping, the positioning accuracy of the navigation technique is facilitated, and, as a result, the accuracy of the object fetching operation carried out by the automated guided vehicle is facilitated.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An automated guided vehicle, comprising:
an image capturing device;
a storage device;
a fetching device, fetching an object to be fetched in a field;
a driving device, driving the automated guided vehicle to move in the field; and
a processor, coupled to the image capturing device, the storage device, the fetching device, and the driving device, wherein the processor is configured to:
control, in accordance with a navigation coordinate system, the automated guided vehicle to move from a starting position to a target position corresponding to the object to be fetched;
capture, by using the image capturing device, a depth image from the target position;
perform image recognition on the depth image to obtain reference pixel information;
convert, in accordance with a coordinate mapping algorithm, the reference pixel information to the navigation coordinate system to obtain a calibrated position; and
determine, in accordance with the target position and the calibrated position, an object-fetching route, and control the automated guided vehicle to move in accordance with the object-fetching route and fetch the object to be fetched.

2. The automated guided vehicle as claimed in claim 1, wherein the reference pixel information comprises pixel coordinate values of the object to be fetched and a rotation angle, and the processor is further configured to:
perform the image recognition on the depth image by using an artificial intelligence image recognition model to obtain the pixel coordinate values and the rotation angle; and
obtain a center distance by using the image capturing device.

3. The automated guided vehicle as claimed in claim 2, wherein the coordinate mapping algorithm is a perspective-n-point (PnP) algorithm, and the processor is further configured to:
obtain a rotation matrix and a translation matrix in accordance with the PnP algorithm;
calculate a position of the object to be fetched in a coordinate system of the image capturing device in accordance with the pixel coordinate values;
convert the position of the object to be fetched in the coordinate system of the image capturing device into the navigation coordinate system by using the rotation matrix and the translation matrix, so as to obtain the calibrated position; and
update the calibrated position to the navigation coordinate system.

4. The automated guided vehicle as claimed in claim 2, wherein the artificial intelligence image recognition model is a convolutional neural network model trained by using a plurality of images of the object to be fetched as a data set.

5. The automated guided vehicle as claimed in claim 1, wherein the navigation coordinate system is a two-dimensional simultaneous localization and mapping (2D SLAM) coordinate system.

6. The automated guided vehicle as claimed in claim 1, wherein the object to be fetched is a pallet, the fetching device comprises a fork, and the automated guided vehicle forks the pallet by using the fork and fetches the object to be fetched.

7. The automated guided vehicle as claimed in claim 1, wherein the image capturing device is one of a depth camera, an infrared light emitter and an infrared lens element, a plurality of cameras, and a projection device and a camera.

8. The automated guided vehicle as claimed in claim 1, wherein the driving device comprises a single steering wheel mechanism, the object-fetching route is a smooth curve, and the smooth curve is set in accordance with the target position and the calibrated position by using a Bezier curve function.

9. The automated guided vehicle as claimed in claim 1, wherein the driving device comprises one of a two-wheeled differential mechanism, a Mecanum wheel mechanism, and a double steering wheel mechanism.

10. The automated guided vehicle as claimed in claim 9, wherein the processor is further configured to:
control the automated guided vehicle to move to a front of the object to be fetched in accordance with the object-fetching route; and
control the automated guided vehicle to rotate in situ to align the fetching device with the object to be fetched and fetch the object to be fetched.

11. A method of calibrating an object-fetching route, suitable for an automated guided vehicle, the method comprising:
controlling, in accordance with a navigation coordinate system, the automated guided vehicle to move from a starting position to a target position corresponding to an object to be fetched;
capturing, by using an image capturing device, a depth image from the target position;
performing image recognition on the depth image to obtain reference pixel information;
converting, in accordance with a coordinate mapping algorithm, the reference pixel information into the navigation coordinate system to obtain a calibrated position; and
determining, in accordance with the target position and the calibrated position, the object-fetching route, and controlling the automated guided vehicle to move in accordance with the object-fetching route and fetch the object to be fetched.

12. The method of calibrating the object-fetching route as claimed in claim 11, wherein the reference pixel information comprises pixel coordinate values of the object to be fetched and a rotation angle, and performing the image recognition on the depth image to obtain the reference pixel information comprises:
performing the image recognition on the depth image by using an artificial intelligence image recognition model to obtain the pixel coordinate values and the rotation angle; and
obtaining a center distance by using the image capturing device.

13. The method of calibrating the object-fetching route as claimed in claim 12, wherein the coordinate mapping algorithm is a perspective-n-point (PnP) algorithm, and converting, in accordance with the coordinate mapping algorithm, the reference pixel information into the navigation coordinate system to obtain the calibrated position comprises:

obtaining a rotation matrix and a translation matrix in accordance with the PnP algorithm;

calculating a position of the object to be fetched in a coordinate system of the image capturing device in accordance with the pixel coordinate values;

converting the position of the object to be fetched in the coordinate system of the image capturing device into the navigation coordinate system by using the rotation matrix and the translation matrix, so as to obtain the calibrated position; and updating the calibrated position to the navigation coordinate system.

14. The method of calibrating the object-fetching route as claimed in claim 12, wherein the artificial intelligence image recognition model is a convolutional neural network model trained by using a plurality of images of the object to be fetched as a data set.

15. The method of calibrating the object-fetching route as claimed in claim 11, wherein the navigation coordinate system is a two-dimensional simultaneous localization and mapping (2D SLAM) coordinate system.

16. The method of calibrating the object-fetching route as claimed in claim 11, wherein the object to be fetched is a pallet, the fetching device comprises a fork, and the automated guided vehicle forks the pallet by using the fork and fetches the object to be fetched.

17. The method of calibrating the object-fetching route as claimed in claim 11, wherein the image capturing device is one of a depth camera, an infrared light emitter and an infrared lens element, a plurality of cameras, and a projection device and a camera.

18. The method of calibrating the object-fetching route as claimed in claim 11, wherein the automated guided vehicle comprises a single steering wheel mechanism, the object-fetching route is a smooth curve, and the smooth curve is set in accordance with the target position and the calibrated position by using a Bezier curve function.

19. The method of calibrating the object-fetching route as claimed in claim 11, wherein the automated guided vehicle comprises one of a two-wheeled differential mechanism, a Mecanum wheel mechanism, and a double steering wheel mechanism.

20. The method of calibrating the object-fetching route as claimed in claim 19, wherein controlling the automated guided vehicle to move in accordance with the object-fetching route and fetch the object to be fetched comprises:

controlling the automated guided vehicle to move to a front of the object to be fetched in accordance with the object-fetching route; and controlling the automated guided vehicle to rotate in situ to be aligned with the object to be fetched and fetch the object to be fetched.

* * * * *